(12) United States Patent
Wright et al.

(10) Patent No.: US 9,975,784 B2
(45) Date of Patent: May 22, 2018

(54) SYSTEM FOR CONTROLLING WASTE WATER TREATMENT IN A WASTE WATER TREATMENT PLANT

(71) Applicant: ClearCove Systems, Inc., Victor, NY (US)

(72) Inventors: Terry Wright, Rochester, NY (US); Timothy J. Cornelison, Saugerties, NY (US); Arvid Abrams, Fort Plain, NY (US)

(73) Assignee: ClearCove Systems, Inc., Rochester, NY (US)

( * ) Notice: Subject to any disclaimer, the term of this patent is extended or adjusted under 35 U.S.C. 154(b) by 599 days.

(21) Appl. No.: 14/584,228

(22) Filed: Dec. 29, 2014

(65) Prior Publication Data

US 2016/0185616 A1    Jun. 30, 2016

(51) Int. Cl.
| | |
|---|---|
| *B01D 21/30* | (2006.01) |
| *C02F 1/00* | (2006.01) |
| *B01D 21/34* | (2006.01) |
| *B01D 21/00* | (2006.01) |
| *B01D 21/02* | (2006.01) |
| *B01D 21/24* | (2006.01) |
| *B01D 21/01* | (2006.01) |

(52) U.S. Cl.
CPC .......... *C02F 1/008* (2013.01); *B01D 21/0006* (2013.01); *B01D 21/0012* (2013.01); *B01D 21/02* (2013.01); *B01D 21/2405* (2013.01); *B01D 21/34* (2013.01); *B01D 21/01* (2013.01); *C02F 2209/40* (2013.01)

(58) Field of Classification Search
None
See application file for complete search history.

(56) References Cited

U.S. PATENT DOCUMENTS

| | | | | |
|---|---|---|---|---|
| 3,664,951 A | * | 5/1972 | Armstrong | B01D 21/0009 204/232 |
| 4,221,633 A | * | 9/1980 | Laipenieks | B01D 21/00 162/154 |
| 4,933,524 A | * | 6/1990 | Meurer | B01D 17/0211 210/109 |
| 2010/0140190 A1 | * | 6/2010 | Wright | B01D 21/0006 210/798 |

* cited by examiner

*Primary Examiner* — Richard C Gurtowski
(74) *Attorney, Agent, or Firm* — Harris Beach PLLC; Neal L. Slifkin

(57) ABSTRACT

An adaptive waste water treatment plant includes an influent intake configured to receive an influent flow from a waste water influent stream. A first settling tank is in a controllable fluid communication with the influent intake. The first settling tank includes a first decanter in fluid communication with a first effluent discharge pipe. A first effluent discharge valve is communicatively coupled to a controller. A first flow meter is in communication with the controller and adapted to measure a rate of flow through the first effluent discharge pipe. A second settling tank is similarly configured. The controller is configured to control the controllable fluid communication between the influent intake and the first settling tank and the controllable fluid communication between the influent intake the second settling tank in response to a change in a rate of influent flow.

15 Claims, 11 Drawing Sheets

SYSTEM FOR CONTROLLING WASTE WATER TREATMENT IN A WASTE WATER TREATMENT PLANT

FIELD OF THE APPLICATION

The application relates to waste water treatment and particularly to a system for controlling a waste water treatment plant in response to changing influent flow rates.

BACKGROUND

Waste Water Treatment Plants (WWTP) are typically manually controlled by WWTP operators. WWTP operators control the flow of waste water through the plant following standard procedures. Few if any, real time measurements are available to most operators. WWTP operators react as best as they can to changing conditions related to events ranging from severe weather events to relatively large industrial waste water discharges.

SUMMARY

According to one aspect, an adaptive waste water treatment plant includes an influent intake configured to receive an influent flow from a waste water influent stream. The adaptive waste water treatment plant also includes a controller. A first settling tank is in a controllable fluid communication with the influent intake. The first settling tank includes a first decanter in fluid communication with a first effluent discharge pipe. A first effluent discharge valve is communicatively coupled to the controller and configured to control a fluid communication between the first decanter and the first effluent discharge pipe. A first flow meter is in communication with the controller and adapted to measure a rate of flow through the first effluent discharge pipe. A second settling tank is in a controllable fluid communication with the influent intake. The second settling tank includes a second decanter in fluid communication with a second effluent discharge pipe. A second effluent discharge valve is communicatively coupled to the controller and configured to control a fluid communication between the second decanter and the second effluent discharge pipe. A second flow meter is in communication with the controller and adapted to measure a rate of flow through the second effluent discharge pipe. The controller is configured to control the controllable fluid communication between the influent intake and the first settling tank and the controllable fluid communication between the influent intake the second settling tank in response to a change in a rate of influent flow.

In one embodiment, the controller is configured to close the first effluent discharge valve and to place the influent stream in fluid communication with the first settling tank to fill the first settling tank, to close the second effluent discharge valve and place the influent stream in fluid communication with the second settling tank to fill the second settling tank to open the first effluent discharge valve to decant the first settling tank after a predetermined first settling time, the first settling time commencing with a complete filling of the first settling tank, and, to open the second effluent discharge valve to decant the second settling tank after a predetermined second settling time, the second settling time commencing with a complete filling of the second settling tank.

In another embodiment, the adaptive waste water treatment plant further includes an influent flow sensor in communication with the controller and adapted to measure a rate of influent flow, wherein the controller adjusts at least one of the first effluent discharge valve and the second effluent discharge valve such that the rate of flow through at least one of: the first effluent discharge pipe and the second effluent discharge pipe, or a combined rate of flow through the first effluent discharge pipe and the second discharge pipe, is substantially equal to or greater than the rate of influent flow.

In yet another embodiment, the adaptive waste water treatment plant further includes an influent flow sensor in communication with the controller to measure a rate of influent flow, wherein the controller sets a value of at least one of: the first settling time and the second settling time, so that at least one of: the rate of flow through the first effluent discharge pipe and the rate of flow through the second effluent discharge pipe, or a combined rate of flow through the first effluent discharge pipe and the second discharge pipe substantially equal to or greater than the rate of influent flow.

In yet another embodiment, the adaptive waste water treatment plant further includes a wet well of known volumetric capacity to receive the influent stream, the wet well configured with a first sensor to detect a lower fluid level in the wet well and a second sensor to detect an upper fluid level in the wet well, the first and second sensors in communication with the controller, the controller further adapted to measure a time for the influent stream to fill the wet well, the controller further arranged to utilize the time and the known volumetric capacity to calculate the rate of influent flow, wherein the controller sets a value of at least one of the first settling time and the second settling time to a value so as at least one of the rate of flow through the first effluent discharge pipe and the rate of flow through the second effluent discharge pipe, or a combined rate of flow through the first effluent discharge pipe and the second discharge pipe is substantially equal to or greater than the rate of influent flow.

In yet another embodiment, the adaptive waste water treatment plant further includes a pump to pump the influent stream to the first settling tank and the second settling tank, the pump operating at a known pumping rate, the pump further in communication with the controller, the controller configured to measure a duration of time the pump operates to pump influent to the first settling tank and the second settling tank, and to calculate a rate of influent flow based on a duration of time and a known pumping rate, wherein the controller sets a value of at least one of the first settling time and the second settling time to a value so that a rate of flow through at least one of: the first effluent discharge pipe and the second effluent discharge pipe, or a combined rate of flow through the first effluent discharge pipe and the second discharge pipe is substantially equal to or greater than the rate of influent flow.

In yet another embodiment, the controller places the influent stream in fluid communication with the first settling tank, and not in fluid communication with the second settling tank, and responsive to detecting a predetermined switching criteria, and the controller places the influent stream in fluid communication with the second settling tank, and not in fluid communication with the first settling tank.

In yet another embodiment, at least one predetermined switching criteria is selected from the group consisting of: an amount of fluid in the first settling tank exceeding a first predetermined threshold, a volume of fluid in the settling tank being less than a second predetermined threshold, and a time that the influent stream has been in fluid communication with the first settling tank exceeding a third predetermined threshold.

In yet another embodiment, the controller is responsive to at least one missing exception criterion.

In yet another embodiment, at least one exception criterion comprises an amount of fluid in the first settling tank being less than a predetermined minimum threshold.

In yet another embodiment, at least one of the first decanter and the second decanter includes an SBX.

In yet another embodiment, the controller is configured to control the first settling tank controllable fluid communication and the second settling tank controllable fluid communication according to a time of day mode.

In yet another embodiment, the controller is configured to control the first settling tank controllable fluid communication and the second settling tank controllable fluid communication according to an equalize flow mode.

In yet another embodiment, the controller is configured to control the first settling tank controllable fluid communication and the second settling tank controllable fluid communication according to a variable settling time mode.

In yet another embodiment, the controller is configured to control the first settling tank controllable fluid communication and the second settling tank controllable fluid communication according to a high flow mode or a maximum flow mode The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
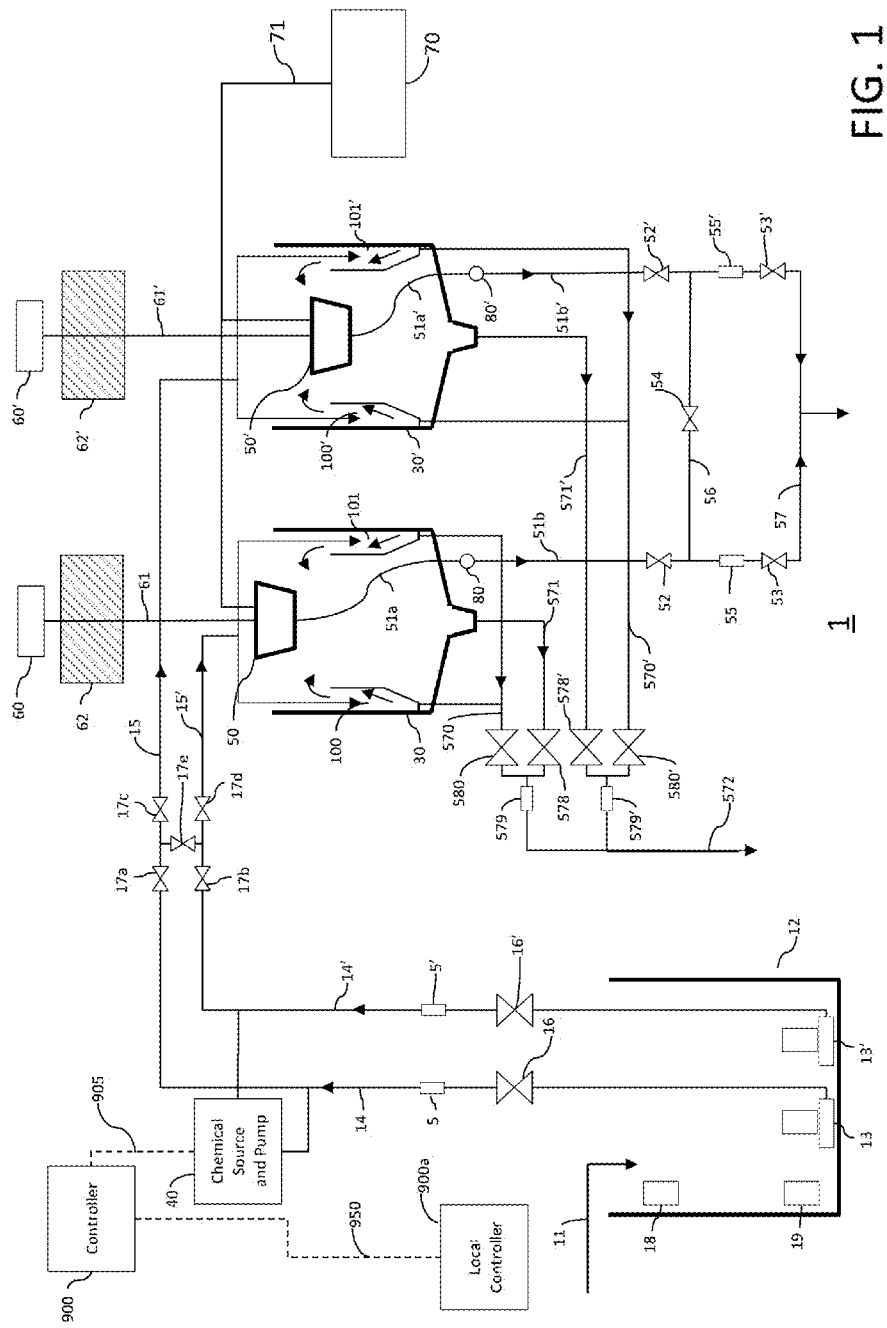
FIG. 1 shows a block diagram of an exemplary embodiment of a waste water treatment plant to separate solids, grits and solvated materials from waste water.

The current application relates to treatment of waste water. The application incorporates the following United States patents and pending applications that disclose systems and processes for primary clarification. U.S. Pat. No. 7,972,505, PRIMARY EQUALIZATION SETTLING TANK (the '505 patent), to Wright; U.S. Pat. No. 8,225,942 to Wright, SELF-CLEANING INFLUENT FEED SYSTEM FOR A WASTEWATER TREATMENT PLANT; U.S. Pat. No. 8,398,864 SCREENED DECANTER ASSEMBLY FOR A SETTLING TANK (the '864 patent) to Wright; co-pending U.S. patent application Ser. No. 14/142,197 METHOD AND APPARATUS FOR A VERTICAL LIFT DECANTER SYSTEM IN A WATER TREATMENT SYSTEM by Wright (the '197 application); co-pending U.S. patent application Ser. No. 14/142,099 FLOATABLES AND SCUM REMOVAL APPARATUS FOR A WASTE WATER TREATMENT SYSTEM by Wright; co-pending U.S. patent application Ser. No. 14/325,421 IFS AND GRIT BOX FOR WATER CLARIFICATION SYSTEMS by Wright (the '421 application); co-pending U.S. patent application Ser. No. 14/490,944 SYSTEM AND METHOD USING SENSORS TO CONTROL A VERTICAL LIFT DECANTER SYSTEM IN A WATER TREATMENT SYSTEM by Wright (the '944 application); co-pending U.S. patent application Ser. No. 14/503,441 METHOD AND APPARATUS FOR SEPARATING STIBLE BIOLOGICAL DIG MATERIALS FROM AN INFLUENT STREAM by Wright (the '441 application); co pending U.S. patent application Ser. No. 14/471,247 METHOD AND APPARATUS FOR USING AIR SCOURING OF A SCREEN IN A WATER TREATMENT FACILITY by Wright (the '247 application); co-pending U.S. patent application Ser. No. 14/503,455 APPARATUS FOR SEPARATING MATERIALS FROM AN INFLUENT STREAM by Wright (the '455 application); co-pending U.S. patent application Ser. No. 14/503,494 APPARATUS FOR ELECTIVELY TREATING SLUDGE TO REMOVE COMPONENTS THEREFROM by Wright (the '494 application); and, co-pending U.S. patent application Ser. No. 14/503,526 APPARATUS FOR TREATMENT OF SLUDGE by Wright (the '526 application). All of the patents and applications referenced by this paragraph from the '505 application to the '526 application are incorporated herein by reference in their entirety for all purposes.

As described hereinabove, Waste Water Treatment Plants (WWTP) are typically manually controlled by WWTP operators. WWTP operators control the flow of waste water through the plant following standard procedures. Few if any, real time measurements are available to most operators. WWTP operators react as best as they can to changing conditions related to events ranging from severe weather events to relatively large industrial waste water discharges.

It would be desirable to automate the control and operation of a WWTP to reduce operating costs, minimize energy use, optimize separation of biological digestible materials from the influent stream for energy production, ensure compliance with discharge requirements and optimize operation during exceptional events. As part of the automated operation of the WWTP it is further desirable to automatically account for seasonal and diurnal variations in the incoming flow of waste water and optimize the treatment process based on measurements of the waste water as it passes through and undergoes treatment through the plant. It is further desirable that the WWTP controller has the capability to detect and automatically respond to deviations from these regular seasonal and diurnal variations such as may be associated with exceptional events such as increased flow due to storm events or the influx of pollutants, chemicals or other undesirable materials due to a spill or industrial discharge. It is further desirable to easily reprogram the control strategy when events such as a local conference, Super Bowl™ Sunday, or other predictable occurrence will result in predictable deviations from otherwise anticipated flows. It is further desirable to separate and purify the biologically digestible materials from the waste water to generate energy via processes such as anaerobic digestion. In the present application a WWTP is outfitted with one or more controllers, sensors, computer controlled valves, pumps and other devices to measure monitor and control the treatment of waste water by a WWTP.

While one goal for the operation of a water treatment is the optimal separation of energy producing biologically digestible materials, the plant should be operated in a manner that prevents, or at least minimizes, the discharge of untreated or inadequately treated waste water. Typical waste water plants must operate over a large range of operating conditions with respect to the volume and characteristics of the influent. Some of these variations, such as regular diurnal and seasonal variations in waste water influent flow rates and composition can be anticipated and planned for based on historical observations. Other variations can be harder or impossible to plan for, including by way of example, industrial discharges into sewer system and major storms. In accordance with the current application, one or more controllers are used to optimize the operating mode of a waste water treatment plant. It is desirable, as part of automating the operation of a WWTP to have an adaptive WWTP that can automatically adapt to changes in the changes in characteristics of the influent, changes of state in the waste water treatment plant, and/or changes in one or more characteristics of the materials in the influent stream as they are being processed by the waste water treatment plant to incrementally adjust the operating conditions to balance these competing requirements.

FIG. 1 shows a block diagram of one embodiment of a waste water treatment plant in accordance with the current application. Waste treatment plant 1 wet well 12 is in fluid communication with pipes 11. An influent stream enters the waste water treatment system 1 at the waste water treatment plant influent intake via pipes 11 where it is stored in wet well 12. The influent stream may consist of influent from sanitary sewers connected to residences and offices, industrial discharge sources, storm sewers or other source or sources. Influent resulting from sanitary sewers may also include rain and other run off due to infiltration of sewer lines as a result of leaks and/or breaks in the sewer lines.

Figure 2:
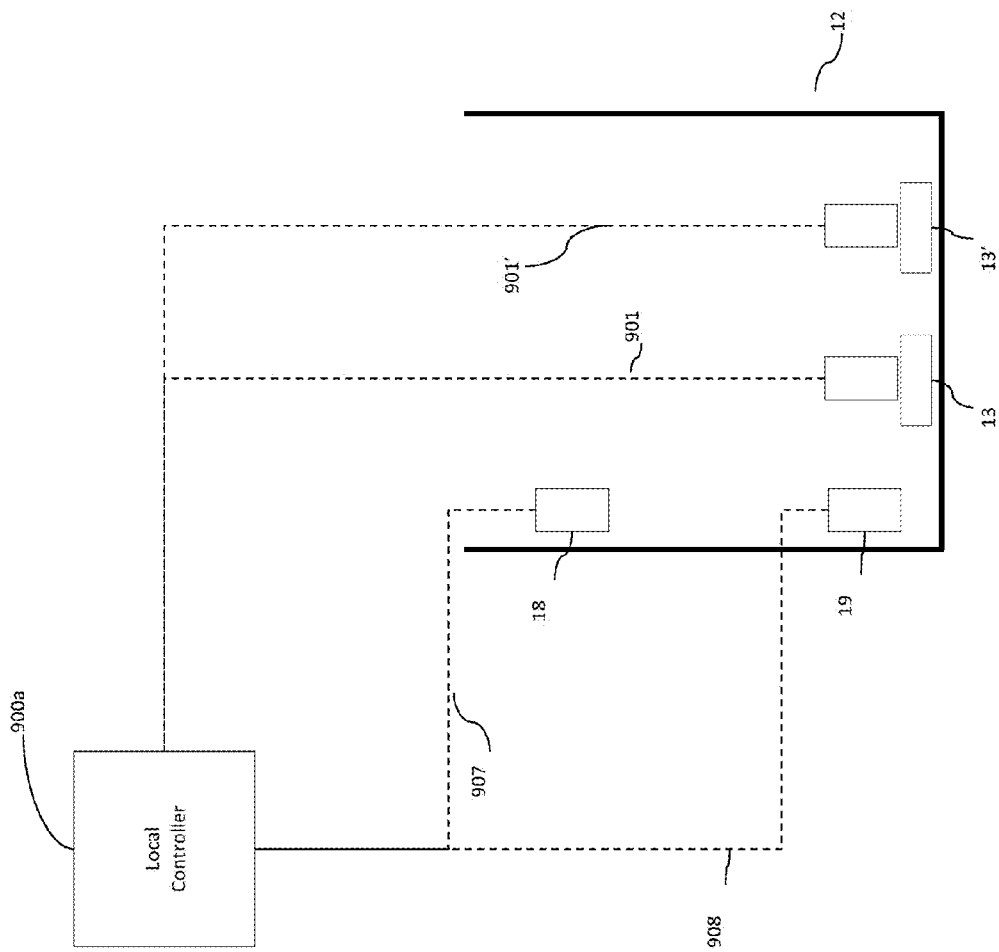
FIG. 2 shows a portion of the waste water treatment of FIG. 1 and related interconnections with a controller.

With reference to FIG. 1 and FIG. 2, wet well 12 is arranged with pumps 13, 13' in communication with and controlled by controller 900a via communication lines 901, 901'. Controllers are well known in the art. A controller may be, without limitation, a general purpose programmable computer, a programmable logic controller or a SCADA. Where there are two or more controllers (e.g. two or more controllers communicatively coupled together), controllers can be of the same type controller, or of a different type controller. Controller 900a is in communication with and optionally under control of controller 900 via communication channel 950. Controller 900a turns on one or more of pump 13, 13' in response to an indication of the wet well 12 fluid level reaching an upper limit, the indication provided by sensor 18 in communication with controller 900a via communication channel 907. In a typical embodiment only one of pumps 13, 13' is turned on in response to an indication of the wet well 12 fluid reaching an upper limit, the second pump being used as a backup in the event of a failure or maintenance event associated with the other pump. Controller 900a turns off the one or more pumps 13, 13' in response to an indication of the wet well 12 fluid level reaching a lower limit. The lower limit indication can be provided by any suitable sensor, such as, for example, by a sensor 19 in communication with controller 900a via communication channel 908.

Figure 3:
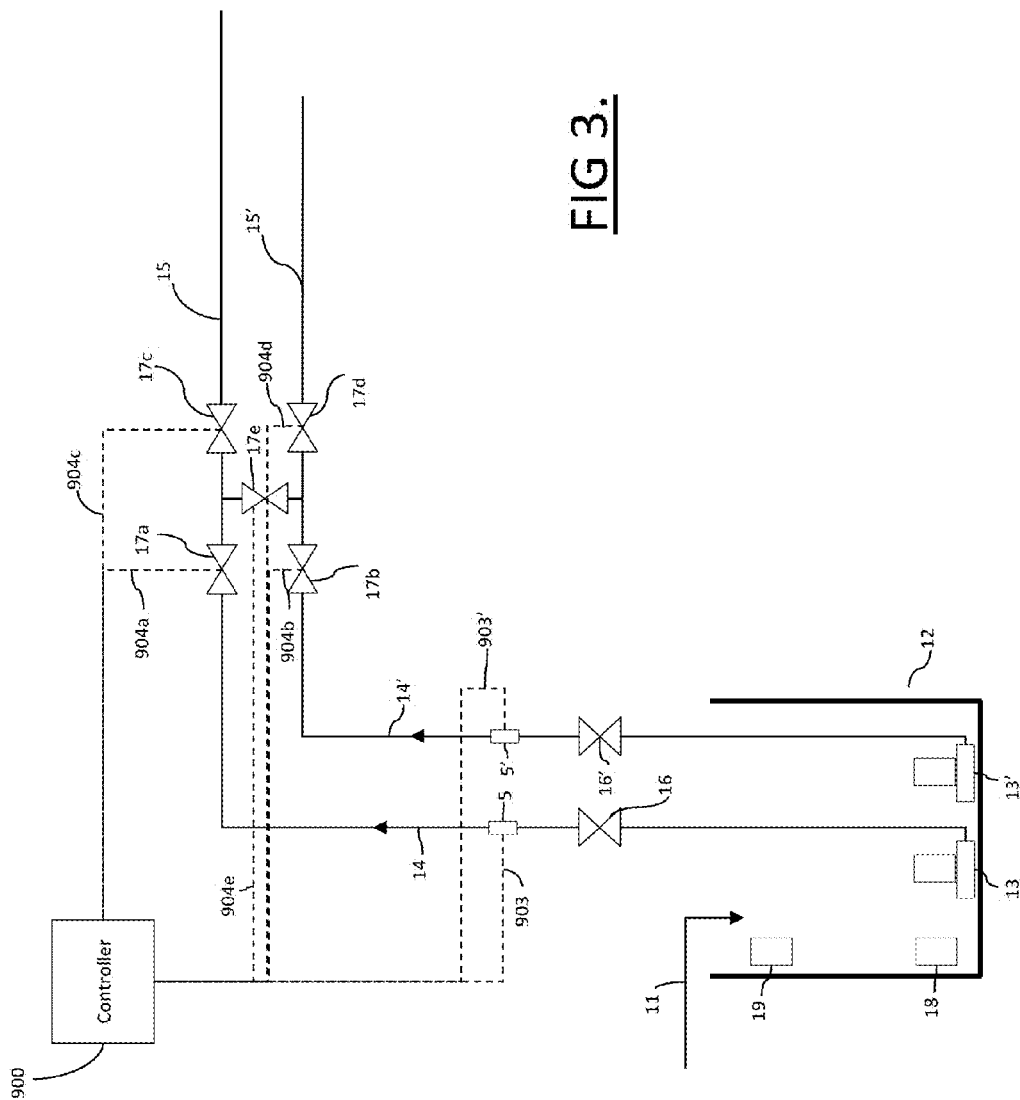
FIG. 3 shows another portion of the waste water treatment of FIG. 1 and related interconnections with a controller.

With reference to FIG. 1, pumps 13, 13' are in fluid communication with settling tanks 30, 30' via pipes 14, 14' and 15, 15'. Pipes 14, 14' are configured with flap valves 16, 16' and flow meters 5, 5'. Valves 17a-17e are arranged to control fluid communication between pipes 14, 14' and pipes 15, 15'. Referring to FIG. 3, valves 17a-17e are in communication with and controlled by controller 900 via communication channels 904a-904e. Flow meters 5, 5' are in communication with controller 900 via communication channels 903, 903'.

Returning to FIG. 1 pumps 13, 13' typically pump influent from the wet well 12 at a substantially constant flow rate to facilitate the separation of solvated and un-solvated materials in the IFS' 100, 101, 100', 101' and settling tanks 30, 30' as described in more detail hereinbelow and in further detail in the '421 application '505 patent and '864 patent. Settling tank 30 is configured with and in fluid communication with influent feed systems (IFS's) 100, 101. Settling tank 30' is configured with and in fluid communication with IFS's 100', 101'.

Continuing with FIG. 1, pumps 13, 13' typically pump influent from the wet well 12 to IFS's 100, 101, 100', 101' at a substantially constant flow rate via piping 14, 14', 15 and 15'. As is well known in the art, piping 14, 14', 15 and 15' may be configured with flow-balancing valves (not shown) to assist in delivering a constant flow rate to each of the IFS's 100, 100', 101, 101'. Optionally, flocculants are added to the influent stream prior to its delivery to the IFS's 100, 101, 100', 101' by flocculant delivery system 40 in fluid communication with pipes 14, 14'. The use of flocculants, for the removal of solids and solvated materials in the treatment of waste water and designs to add flocculants to an influent waste water stream are well known in the art. The influent traverses the IFS's 100, 101, 100', 101' to enter the clarification settling tanks 30, 30'.

Figure 4:
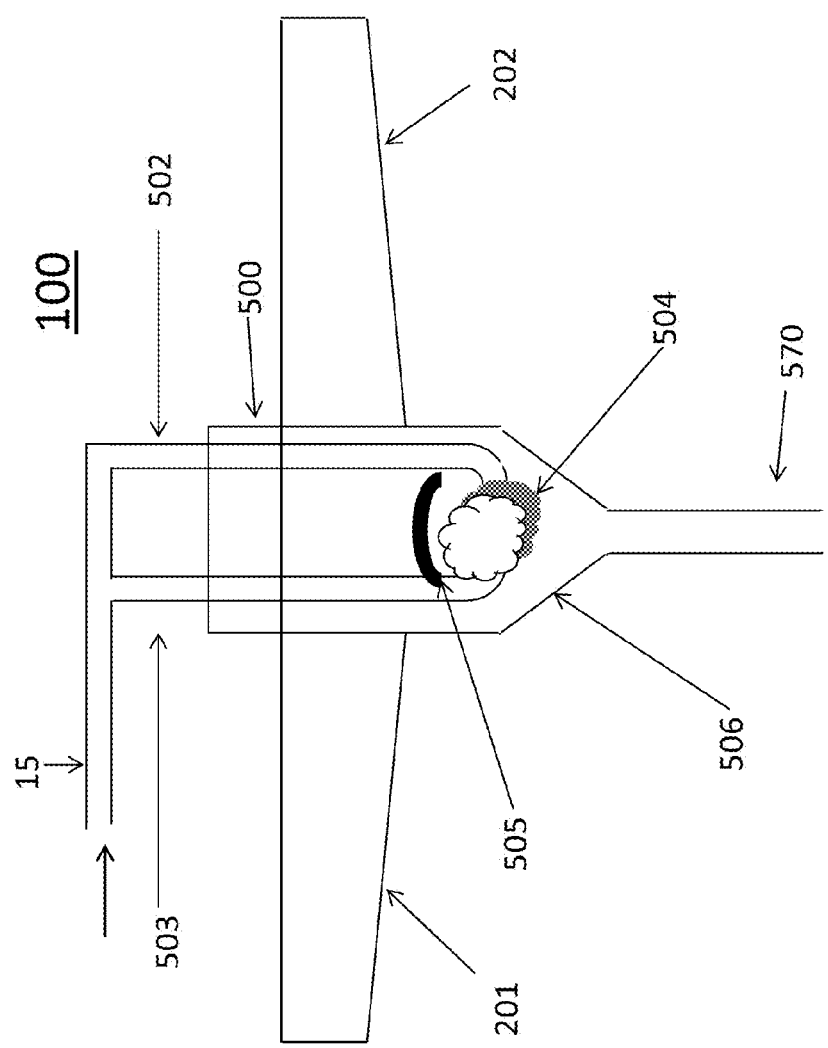
FIG. 4 shows a side view of an exemplary influent feed system (IFS) with IFS troughs and grit box.
Figure 5:
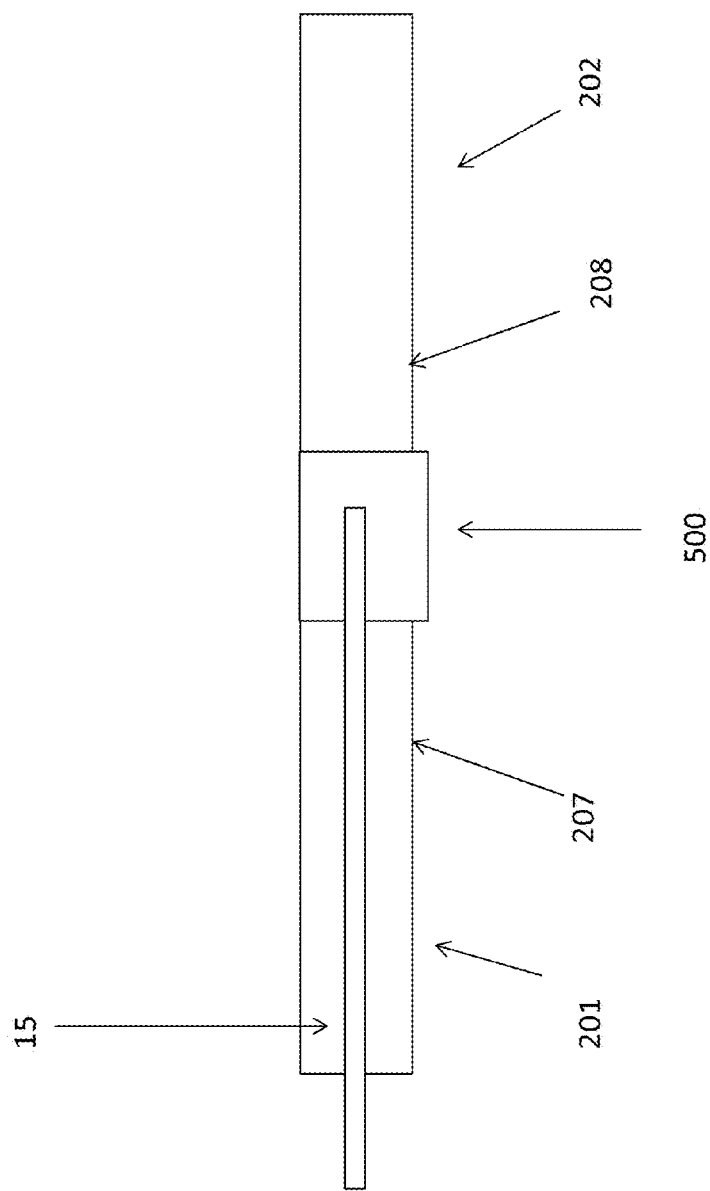
FIG. 5 shows a top view of the IFS of FIG. 4.

In one embodiment IFS's 100, 101, 100', and 101' are substantially similar to the IFS described in the '421 application and as depicted in FIG. 4 and FIG. 5. FIG. 4 and FIG. 5 show a side view and top view respectively of an exemplary IFS 100 with IFS troughs and grit box. IFS 100 is configured with a grit box 500 and two IFS troughs 201, 202 in fluid communication with the grit box 500 and clarification tank 30. Influent is delivered to the IFS 100 via pipe 15 and split into two streams which enter the grit box 500 via pipes 502, 503. The streams exiting opposing pipes 502, 503 and collide under pressure to create a turbulent mixing zone 504. A deflector plate 505 is positioned above the mixing zone 504 to confine the volume of the mixing zone and return the upward velocities of the streams existing pipes 502, 503 back into the mixing Zone 504. Grit, dense solids and flocs are deposited in the grit box hopper 506. Influent fills the IFS troughs 201, 202 and then spills over sidewalls 207, 208 (FIG. 5) into the clarification tank 30 (FIG. 1).

As described in the, '505 patent, '864 patent and '197 application, grits, solids, and optionally solvated materials, are selectively classified and separated from the influent via sedimentation and optionally flocculation in IFS's 100, 101, 100', 101'. Solids remaining in the influent traversing IFS's 100, 101, 100', 101' to the clarification settling tanks 30, 30' are further classified and separated from the influent via sedimentation.

With reference to FIG. 1 and FIG. 4, sludge discharge pipe 570 is in fluid communication with IFS's 100, 101 and sludge discharge pipe 572. Sludge discharge pipe 570' is in fluid communication with IFS's 100', 101' and sludge discharge pipe 572. Valve 580 is arranged to control fluid communication between sludge discharge pipe 570 and sludge discharge pipe 572. Valve 580' is arranged to control fluid communication between sludge discharge pipe 570' and sludge discharge pipe 572.

As shown in FIG. 1, sludge discharge pipe 571 is in fluid communication with clarification tank 30 and sludge discharge pipe 572. Sludge discharge pipe 571' is in fluid communication with clarification tank 30' and sludge discharge pipe 572. Valve 578 and valve 578' are arranged to control the flow of fluid through sludge discharge pipe 570 and sludge discharge pipe 570' respectively. Sludge discharged from discharge pipe 572 may be further treated to isolate and optimize biologically digestible materials for the production of energy as disclosed in the '526, '441, '455, and '494 applications.

Figure 6:
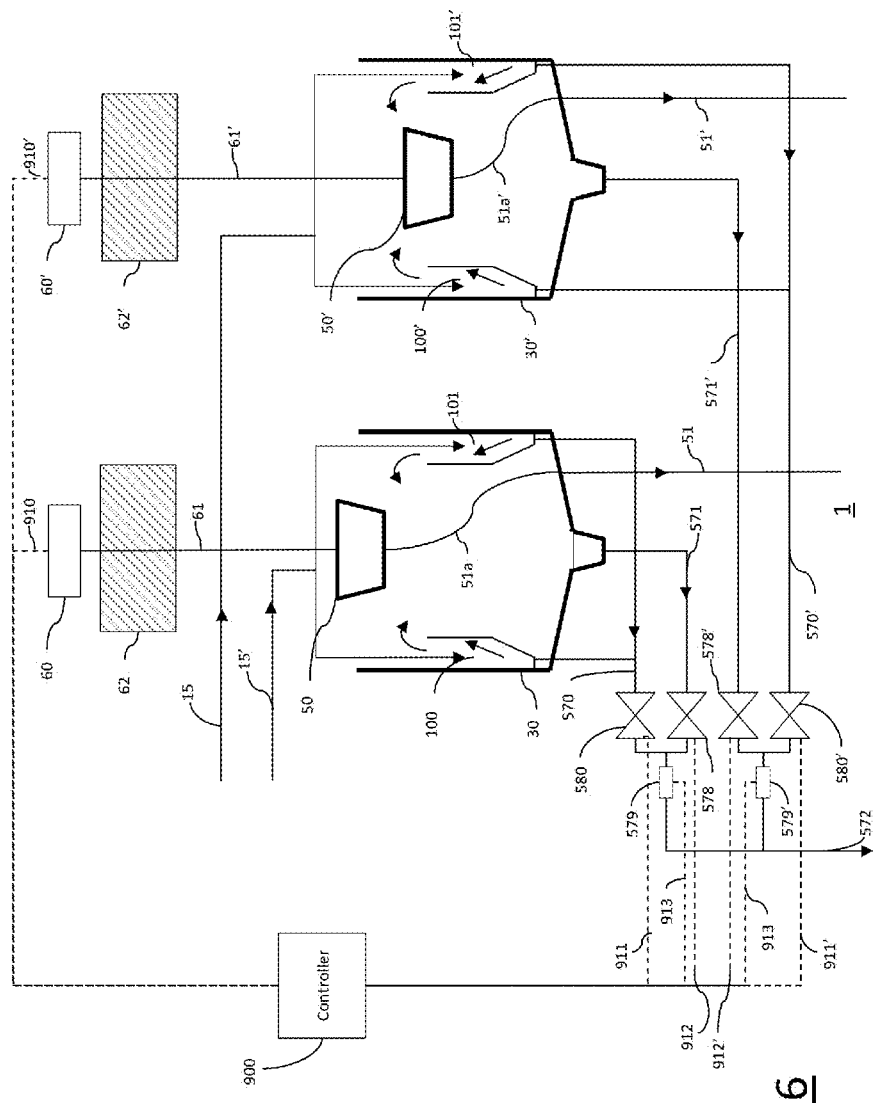
FIG. 6 shows another portion of the waste water treatment of FIG. 1 and related interconnections with a controller.

As shown with reference to FIG. 6, valves 580, 580' are in communication with and under the control of controller 900 via communication channels 911, 911'. Valves 578, 578' are in communication with and under the control of controller 900 via communication channels 912, 912'. Flowmeters 579, 579' are in communication with controller 900 via communication channels 913, 913'.

Figure 7:
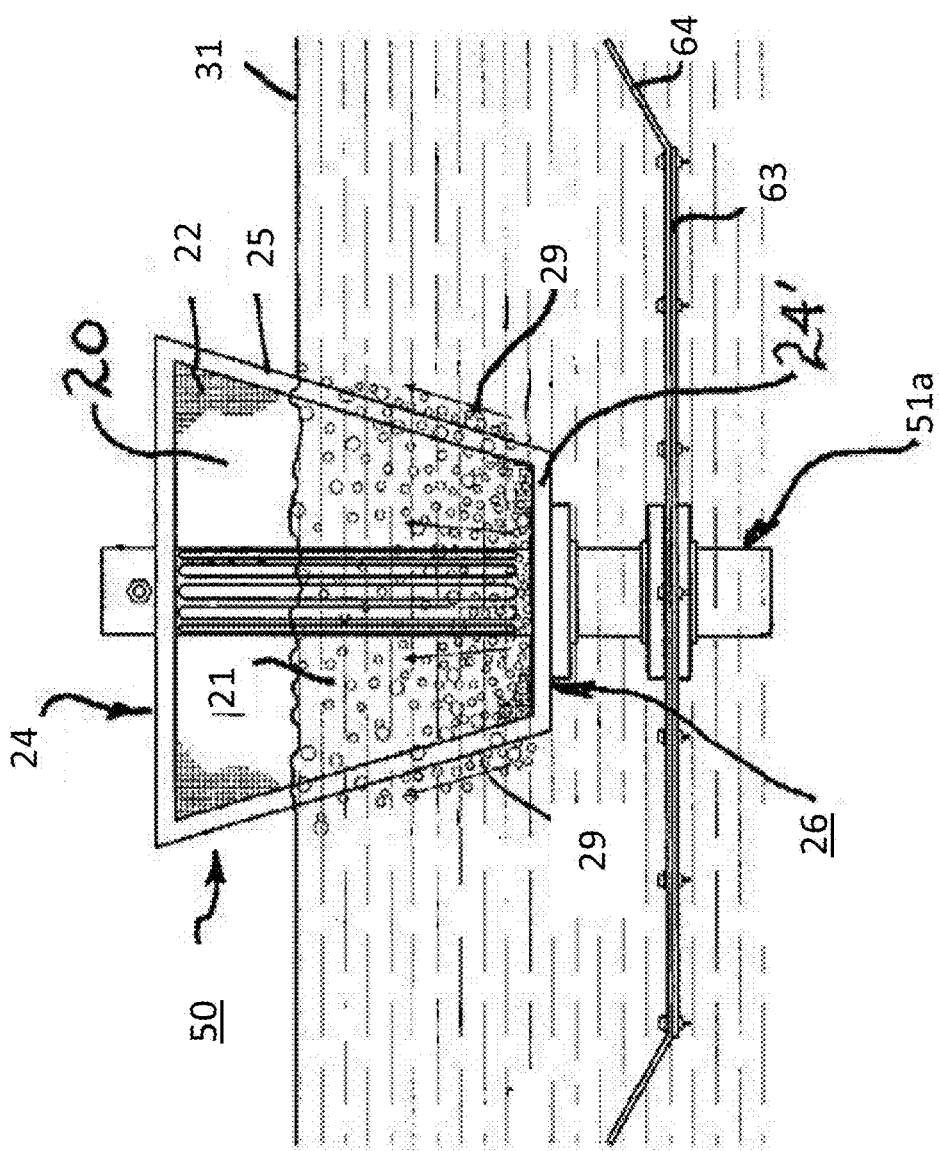
FIG. 7 shows a screened box decanter (SBX)

Returning to FIG. 1, clarification tank 30 and clarification tank 30' are configured with a decanter 50 and decanter 50' respectively. In a preferred embodiment, the decanters 50, 50' are substantially similar to the screen box ("SBX") disclosed in the '197 application. With reference to FIG. 7, the top 24 of SBX 50 is normally open to allow occasional washing. In applications when the screen box operates completely submerged, SBX 50 typically includes a closed and sealed top. The bottom 26 of screen box 50 is a solid plate attached to flexible effluent discharge pipe 51a and an opening to allow screened liquid 21 to exit the screen box via flexible effluent discharge pipe 51a and thus the tank 30.

The sides 20 of exemplary screen box 50 include screen 22 and screen framing members 25 that may be vertical (perpendicular to the liquid surface 31) or sloped so that the top 24 of the SBX 50 is wider than the bottom 26 creating a frustum shape. The ultrafine screen 22 currently preferred is a stainless steel wire woven as a fabric. In a preferred embodiment the ultrafine screen is a 50 mesh screen.

In a representative embodiment, each screen is laminated to a flat sheet of fiber reinforce plastic (FRP) with an air scour header 24' laminate across the base of the screen 22. Preferably, header 24' contains low pressure air on the inside with small openings (not visible in FIG. 7) in the top of the header 24' to provide air bubbles 29 to air scour the screen 22. Other embodiments for an air scour, as disclosed in the '247 application may be used. FIG. 1 air pump 70 provides air for FIG. 1 decanter 50, 50' air scours. FIG. 1 air pump 70 is in fluid communication with air scours for decanters 50, 50' via FIG. 1 air line 71. As shown with respect to FIG. 8, in one embodiment, air pump 70 is in communication with and under the control of controller 900.

Returning to FIG. 1, decanter 50' is similarly in fluid communication with flexible effluent discharge pipe 51a'. Flexible discharge pipes, 51a and 51a' are in fluid communication with effluent discharge pipes 51b and 51b' respectively. Pipe 56 is in fluid communication with effluent discharge pipes 51b and 51b'. Effluent discharge pipes 51b and 51b' are further in fluid communication with effluent discharge pipe 57.

Modulating valves 52 and 52' are arranged to regulate flow of fluid through effluent discharge pipes 51b and 51b' respectively. Flowmeters 55 and 55' are arranged to measure the flow of fluid through effluent discharge pipes 51b and 51b' respectively. Valve 54 controls fluid communication through pipe 56. Valve 53 controls fluid communication between effluent discharge pipe 51b and effluent discharge pipe 57. Similarly, valve 53' controls fluid communication between effluent discharge pipe 51b' and effluent discharge pipe 57'.

Figure 8:
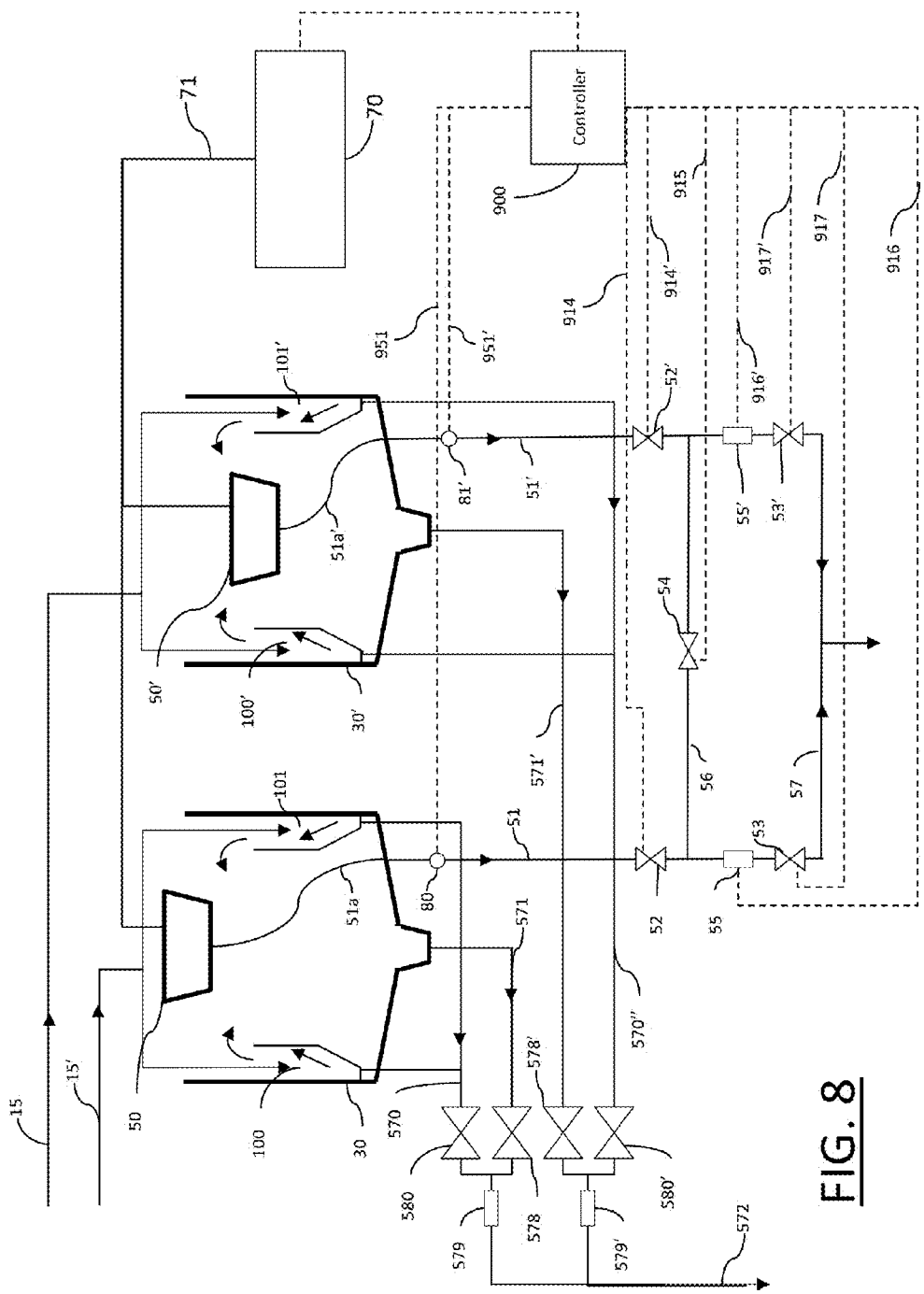
FIG. 8 shows another portion of the waste water treatment of FIG. 1 and related interconnections with a controller.

With reference to FIG. 8, valves 52, 52', 53, 53', are in communication with and under the control of controller 900: valve 52 via communication channel 914; valve 52' via communication channel 914'; valve 53 via communication channel 917; valve 53' via communication channel 917'; and, valve 54 via communication channel 915. Flowmeters 55 and 55' are in communication with controller 900 via communication channels 916 and 916' respectively.

Returning to FIG. 1, decanters 50, 51 are mechanically connected to lifting apparatus 60, 60' via cables 61, 61'. Lifting apparatus 60, 60' for decanter 50, 50' may be a lifting apparatus as described in more detail in the '297 application. In one embodiment lifting apparatus 60, 60' each include a winch and a vector motor, a vector motor being capable of operating at 0 RPM without overheating. The lifting apparatus 60, 60' may further include a local controller (not shown) that controls the raising and lowering of the decanter 50, 50' in a manner substantially similar to one or more of the manners described in the '197 and '994 applications. As shown with reference to FIG. 6, lifting apparatus 60, 60' is in communication with and optionally under the control of controller 900 via communication channels 910, 910'.

Returning to FIG. 1, influent traverses IFS' 100, 101 to fill clarification tank 30. Similarly influent traverses IFS' 100', 101' to fill clarification tank 30'. In a representative manner of operation, as described in more detail in the '505 patent, '864 patent, '197 application and '421 applications, the influent resides in the clarification tanks 30, 30' for a duration (the "settling time") in order to settle and separate solids, and in particular biologically degradable materials, from the influent. After sufficient settling of the solids, the clarified liquid, aka supernatant, is decanted as effluent by decanters 50, 50' and further treated by such secondary and tertiary processes as deemed appropriate. To further remove materials from the effluent, in a representative embodiment, as described hereinabove, the decanters are substantially similar to the screen box ("SBX") disclosed in the '197 application, incorporating a 50 mesh stainless steel screen as shown with respect to FIG. 5.

In a preferred embodiment (FIG. 1; See also: the '197 and '994 applications), as the fluid level of clarification tanks 30 lowers, lifting apparatus 60 lowers the decanter 50. Preferably, the flow rate of the supernatant as it enters the decanter is adjusted to minimize disturbance and re-suspension of the sludge settled in the clarification tank 30 and IFS' 100, 101 and to minimize clogging of the screen by fibers and other residual materials in the supernatant. The flow rate of the influent traversing effluent discharge pipe 51b is measured using flow meter 55 in communication with controller 900. Responsive to the measured flow rate, controller 900 adjusts modulating valve 52 to achieve the desired target flow rate. In normal operation, valve 54 is closed and clarification tank 30' is similarly decanted via effluent discharge pipe 51b', with flow rate measured by flow meter 55' and flow rate controlled by modulating valve 52' as lifting apparatus lowers decanter 50'.

In the event of a failure of flow meter 55 or modulating valve 52, valve 54 may opened and flow meter 55' and modulating valve 53' used to control the decanting of clarification tank 30. Similarly, in the event of a failure of flow meter 55' or modulating valve 52', valve 54 may opened and flow meter 55 and modulating valve 53 used to control the decanting of clarification tank 30'.

Periodically, decanters 50, 50' should be cleaned and have their screens washed to remove material that may be fouling them. In a preferred embodiment, as described in more detail with respect to the '197 application, when cleaning is required lifting apparatus 60, 60' lifts decanters 50, 50' to cleaning stations 62, 62' respectively for cleaning.

In a preferred manner of operating waste water treatment plan 1, the clarification tanks 30, 30' are alternately filled and decanted with the settling time chosen to optimize the amount of biologically digestible materials settled. The amount of biologically digestible materials which should be permitted to settle prior to initiating a decanting or a cleaning cycle may be site and situation specific. By way of example, industrial discharges into sewer system and major storms. In accordance with the current application, one or more controllers are used to optimize the operating mode of a waste water treatment plant.

With reference to FIG. 1, controller 900 operates the plant according to a process that specifies operating parameters and set points for the operation of the waste water plant and optionally rules for changing operational parameters and set points responsive to changes in characteristics of the influent, changes of state in the waste water treatment plant, and/or changes in one or more characteristics of the materials in the influent stream as they are being processed by the waste water treatment plant. In one embodiment, operational set points may include without limitation the parameters shown in Table 1.

TABLE 1

| Operational Set Points | Definition |
|---|---|
| Predicted Influent Flow Rate | Predicted influent flow rate |
| Settling Time | Time duration between filling a clarification tank and initiating a decanting cycle. |
| Effluent Flow Rate | Flow rate for decanting screened effluent from clarification tanks |
| Maximum Filling Time | The maximum time a clarification tank should be allowed to fill |
| Decanter cleaning frequency | The number of decant cycles to before cleaning the decanters |
| Tank sludge removal frequency | The number of decant cycles to perform before removing sludge from clarification tanks |
| IFS sludge removal frequency | The number of decant cycles to perform before removing sludge from IFS' |
| High Tank Level | The clarification tank fluid level when influent flow is to be stopped. |
| Low Tank Level | The clarification tank fluid level when decanting is to be stopped. |
| Maximum Tank Level | The maximum clarification tank level without starting decanting |
| Minimum Tank Fill Level | The minimum clarification tank level for start of decanting |
| Minimum Reserve Tank Capacity | During Max Flow mode, responsive to measurement of the wet well influent flow rate, if the remaining time to fill the clarification tank is less than the Minimum Reserve Tank Capacity amount, the controller 900 modulates the decanter effluent flow rate to its maximum physical limit. |
| Maximum Reserve Tank Capacity | During Max Flow mode, responsive to measurement of the wet well influent flow rate, if the remaining time to fill the clarification tank is greater than the Maximum Reserve Tank Capacity amount, the controller 900 modulates the decanter effluent modulate the decanter effluent flow rate to be equal to the average influent flow rate. | example, to meet water quality goals in a water shed, the amount of BOD (biological oxygen demand, a specific characterization of biologically digestible materials well known to those in the waste water treatment industry and a basis for regulations established by the EPA and DEC) remaining in the effluent may need to be adjusted to ensure phosphates and nitrogen in the waste water are properly removed during the aeration and digestion stage. In other situations it may be desirable to settle as much BOD as possible in order to provide the maximum amount of material for use in an anaerobic digester.

While one goal for the operation of a water treatment is the optimal separation of energy producing biologically digestible materials, the plant should be operated in a manner that prevents, or at least minimizes, the discharge of untreated or inadequately treated waste water. Typical waste water plants must operate over a large range of operating conditions with respect to the volume and characteristics of the influent. Some of these variations, such as regular diurnal and seasonal variations in waste water influent flow rates and composition can be anticipated and planned for based on historical observations. Other variations can be harder or impossible to plan for, including by way of In one embodiment, when alternating the filling and decanting between tanks 30, 30', controller 900 responsive to any of the following conditions tank stops influent flow to tank 30 and starts influent flow to tank 30': tank 30 having fluid level greater than or equal to High Tank Level; tank 30' having a fluid level less than or equal to Low Tank Level; and, the duration of time that tank 30 has been filling exceeds Maximum Filling Time. In one embodiment, when alternating the filling and decanting between tanks 30, 30', controller 900 responsive to any of the aforementioned conditions and the fluid level in tank 30 being greater than or equal to Minimum Tank Fill Level, stops influent flow to tank 30 and starts influent flow to tank 30'.

In a preferred embodiment, one or more of the influent flow characteristics used for operation of the waste water treat plant is based upon historical data characterizing the influent flow. In some embodiments, the controller 900 records the influent characteristics of the influent stream to establish the historical data characterizing the influent flow. In some embodiments, other physical or chemical characteristics of the influent flow may be measured using one or more sensors. In some preferred embodiments, one or more of the influent flow characteristics used is an influent flow rate set point.

In one embodiment the controller 900 is responsive to influent flow rate set points specified by time of day, day of the week and/or season of the year as part of the recipe for operation of the plant. An exemplary schedule with simple recipes is shown with reference to Table 2. As part of the Table 2 schedule, the recipe varies through the course of the day from the first hour of the day, starting at midnight, to the twenty-fourth or last hour of the day. Over the course of the day, the recipe varies to reflect anticipated increases and decreases in the influent flow rate and establishes adjustments to the settling time and target effluent flow rate in accordance with the anticipated changes in solids to be settled from the influent stream. This allows for unique events and fine tuning for local conditions. For example, levels in tanks can be reduced in expectation of a high flow at a later time.

TABLE 2

Exemplary Schedule

Recipe Ingredients

| Recipe by Hour of Day | Predicted Influent Flow (GPM) | High Tank Level (Feet) | Settling Time (Minutes) | Effluent Flow (GPM) |
|---|---|---|---|---|
| 1 | 10 | 4.5 | 10 | 15 |
| 2 | 20 | 4.5 | 10 | 25 |
| 3 | 20 | 4.5 | 10 | 25 |
| 4 | 20 | 4.5 | 10 | 25 |
| 5 | 30 | 4.5 | 15 | 40 |
| 6 | 40 | 4.5 | 15 | 50 |
| 7 | 50 | 4.5 | 20 | 65 |
| 8 | 40 | 4.5 | 15 | 50 |
| 9 | 30 | 4.5 | 15 | 40 |
| 10 | 30 | 4.5 | 15 | 40 |
| 11 | 30 | 4.5 | 15 | 40 |
| 12 | 30 | 4.5 | 15 | 40 |
| 13 | 30 | 4.5 | 15 | 40 |
| 14 | 30 | 4.5 | 15 | 40 |
| 15 | 40 | 4.5 | 15 | 50 |
| 16 | 40 | 4.5 | 15 | 50 |
| 17 | 40 | 4.5 | 15 | 50 |
| 18 | 50 | 4.5 | 20 | 65 |
| 19 | 40 | 4.5 | 15 | 50 |
| 20 | 30 | 4.5 | 15 | 40 |
| 21 | 30 | 4.5 | 15 | 40 |
| 22 | 20 | 4.5 | 10 | 25 |
| 23 | 10 | 4.5 | 10 | 15 |
| 24 | 10 | 4.5 | 10 | 15 |

One or more of the operational set points may be dependent on the current state of one or more components of the waste water plant. In an exemplary preferred embodiment, responsive to changes in the fluid level in clarification tanks 30, 30', controller 900 adjusts the effluent flow rate set point. The effluent flow rate set point will have a relatively larger value when decanting fluid from the upper level of the clarification tanks 30, 30' where the supernatant is clearest, and a relatively lower value when decanting fluid from the lower portion of the clarification tank, where there are higher concentrations of materials with the potential to foul the decanter 30, 30'. The fluid level in clarification tanks 30, 30' may be measured by one of several methods known to those skilled in the art. In one exemplary embodiment the effluent flow rate set point is adjusted as shown in Table 3.

TABLE 3

| Tank Fluid Level (measured in feet from the bottom of the clarification tank) | Effluent Flow Rate Set Point (Gallons per Minute) |
|---|---|
| 2 | 60 |
| 6 | 100 |
| 10 | 140 |

The amount of BOD which should be permitted to settle prior to initiating a decanting and cleaning cycle may be site and situation specific. By way of example, to meet water quality goals in a water shed, the amount of BOD remaining in the effluent may need to be adjusted to ensure phosphates and nitrogen in the waste water are properly removed during the aeration and digestion stage. In other situations it may be desirable to settle as much BOD as possible in order to provide the maximum amount of material for use in an anaerobic digester. Therefore, it is desirable to measure the amount of BOD, and other characteristics of the waste water as material settles in the primary clarification tank. The waste water BOD level may be measured using a variety of techniques, including UV absorption, turbidity, and conductivity as is well known in the art.

In one embodiment the effluent flow rate set point is at least partially determined by measurement of one or more physical characteristics of the effluent discharged by clarification tanks 30, 30'. By way of example, with reference to FIG. 1 and FIG. 8, sensors 80, 80' are arranged to measure one or more characteristics of clarification tank 30, 30' decanter 50, 51 effluent traversing effluent discharge pipes 51, and 51' respectively. Sensors 80, 80' are in communication with controller 900 via communication channels 951, 951'. Sensor 80, 80' may be used to measure BOD, turbidity, conductivity, pH or any other physical or chemical characteristic of the effluent. In one embodiment, responsive to an indication that the BOD of the effluent has increased beyond a predetermined threshold, as measured by sensor 80, the controller 900 reduces effluent flow rate set point and the effluent flow via control of modulating valves 52. In one embodiment, responsive to an indication that the BOD of the effluent has increased beyond a predetermined threshold, as measured by sensor 80, the controller 900 increases the value of the settling time set point used for control of clarification tank 30.

In a typical embodiment, the physical and chemical characteristics of the supernatant will vary according to the depth of the fluid in the clarifying tank 30. By way of example, as solids settle from the supernatant, and the upper portion of the fluid may have a lower level of BOD relative to the lower portion of the fluid may have a higher BOD. Therefore, it is desirable to measure the physical and chemical characteristics of the fluid as function of the depth of the fluid.

Figure 9A:
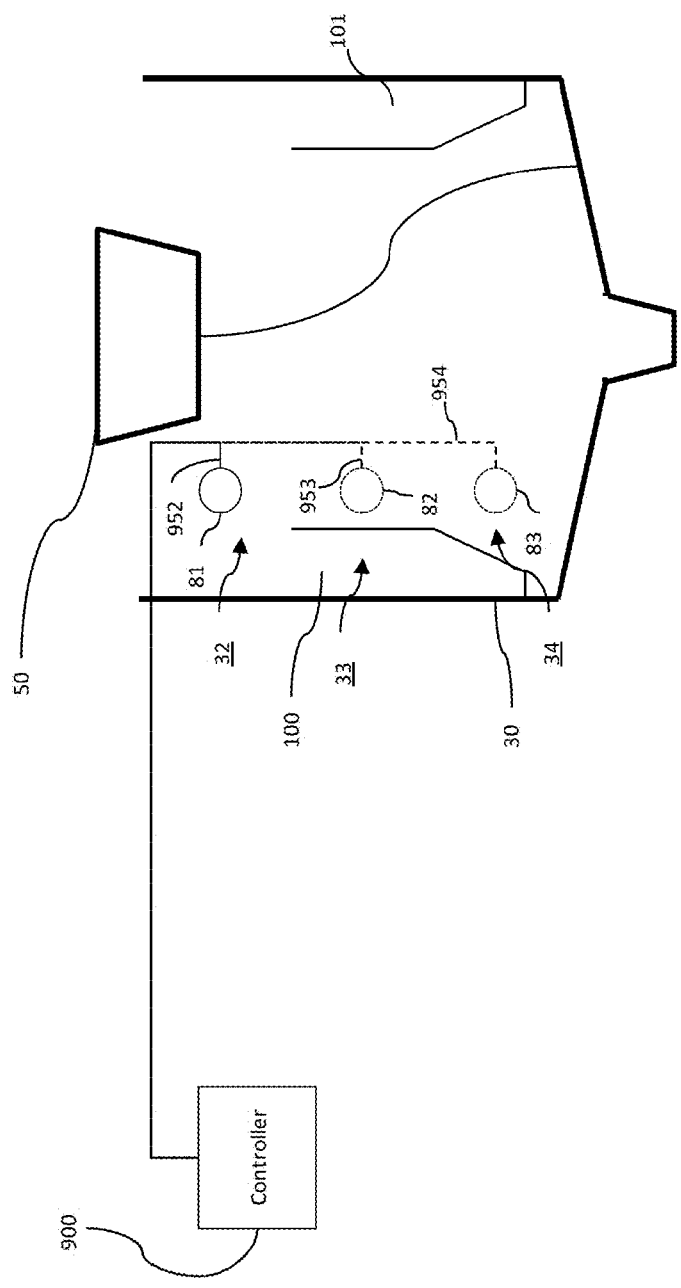
FIG. 9A shows one exemplary embodiment for the arrangement of sensors for sensing characteristics of fluid in a clarification tank.

With reference to FIG. 9A, in one embodiment, a sensor 81 is arranged to measure one or more physical or chemical characteristics of the fluid in an upper portion 32 of clarification tank 30. Optional sensor 82 is arranged to measure one or more physical or chemical characteristics of the fluid in a middle portion 33 of the clarification tank 30. Optional sensor 83 is arranged to measure one or more physical or chemical characteristics of the fluid in a lower portion 34 of the clarification tank 30. Sensor 81 is in communication with controller 900 via communication channel 951. Optional sensors 82, 83 are in communication with controller 900 via communication channels 953 and 954 respectively.

Figure 9B:
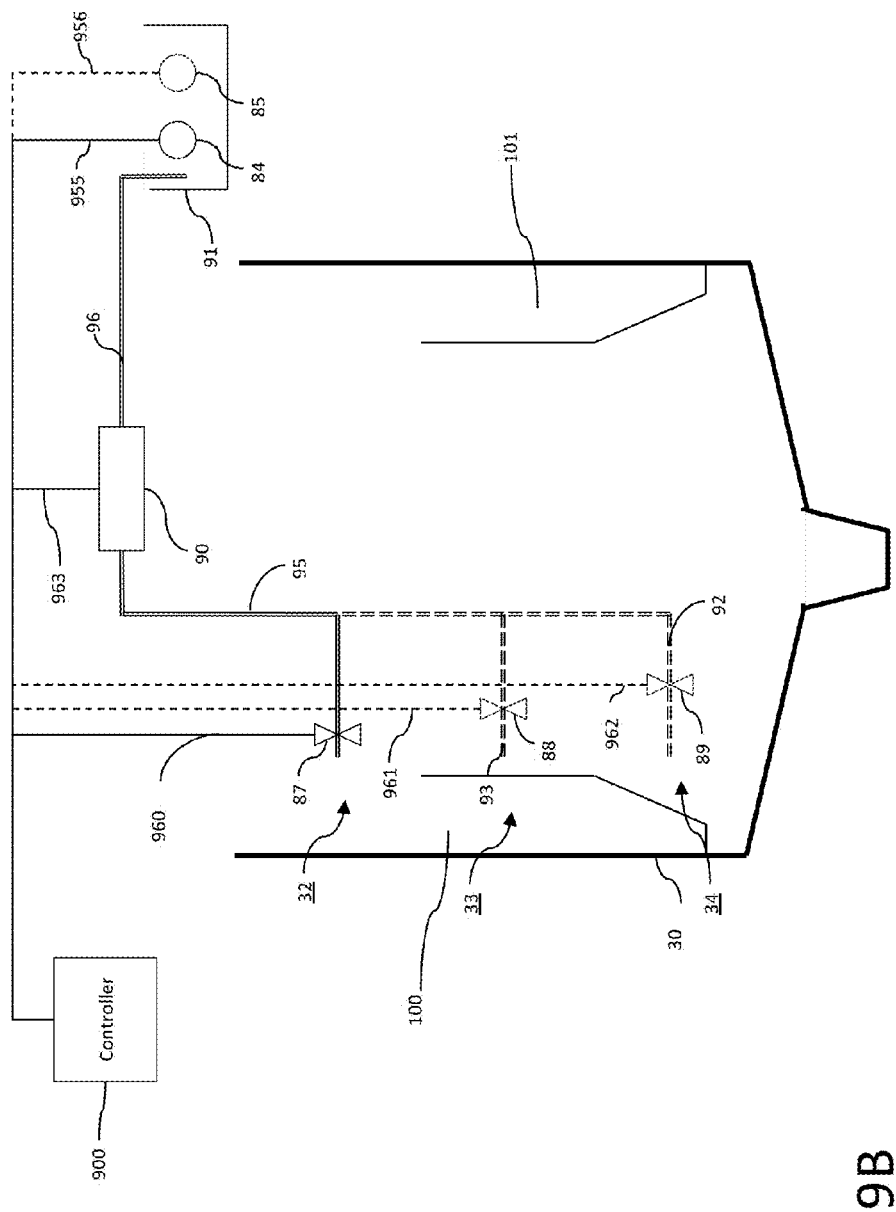
FIG. 9B shows another exemplary embodiment for the arrangement of sensors for sensing characteristics of fluid in a clarification tank.

Referring now to FIG. 9B, in another embodiment, fluid samples are pumped from varying depths of clarification tank 30 to a sampling well 91 by sampling pump 90. Such an arrangement may be desirable compared with placing an individual sensor at every sample point would be prohibitively expensive, or where there might be a requirement for an impractical cross-calibration of multiple sensors. Sampling pump 90 is in fluid communication with sampling well 91 and in communication with and under the control of controller 900. Sampling pipe 95 is in fluid communication with sampling pump 90. Valve 87 controls fluid communication between fluid in an upper portion 32 of clarification tank 30 and sampling pipe 95. Optional sampling pipe 93 is in fluid communication with sampling pump 90. Optional valve 88 controls fluid communication between fluid in a middle portion 33 of clarification tank 30 and optional sampling pipe 93. Optional sampling pipe 92 is in fluid communication with sampling pump 90. Optional valve 89 controls fluid communication between fluid in a middle portion 34 of clarification tank 30 and optional sampling pipe 92. Valve 87 is in communication with and under the control of controller 900 via communication channel 960. Optional valves 88, 89 are in communication with and under the control of controller 900 via communication channels 961 and 962 respectively. Sensor 84 is arranged to measure one or more physical or chemical characteristic of fluid delivered to sample well 91. Sensor 84 is in communication with controller 900 via communication channel 955. Optional sensor 85 is arranged to measure one or more physical or chemical characteristic of fluid delivered to sample well 91. Sensor 85 is in communication with controller 900 via communication channel 956.

Figure 9C:
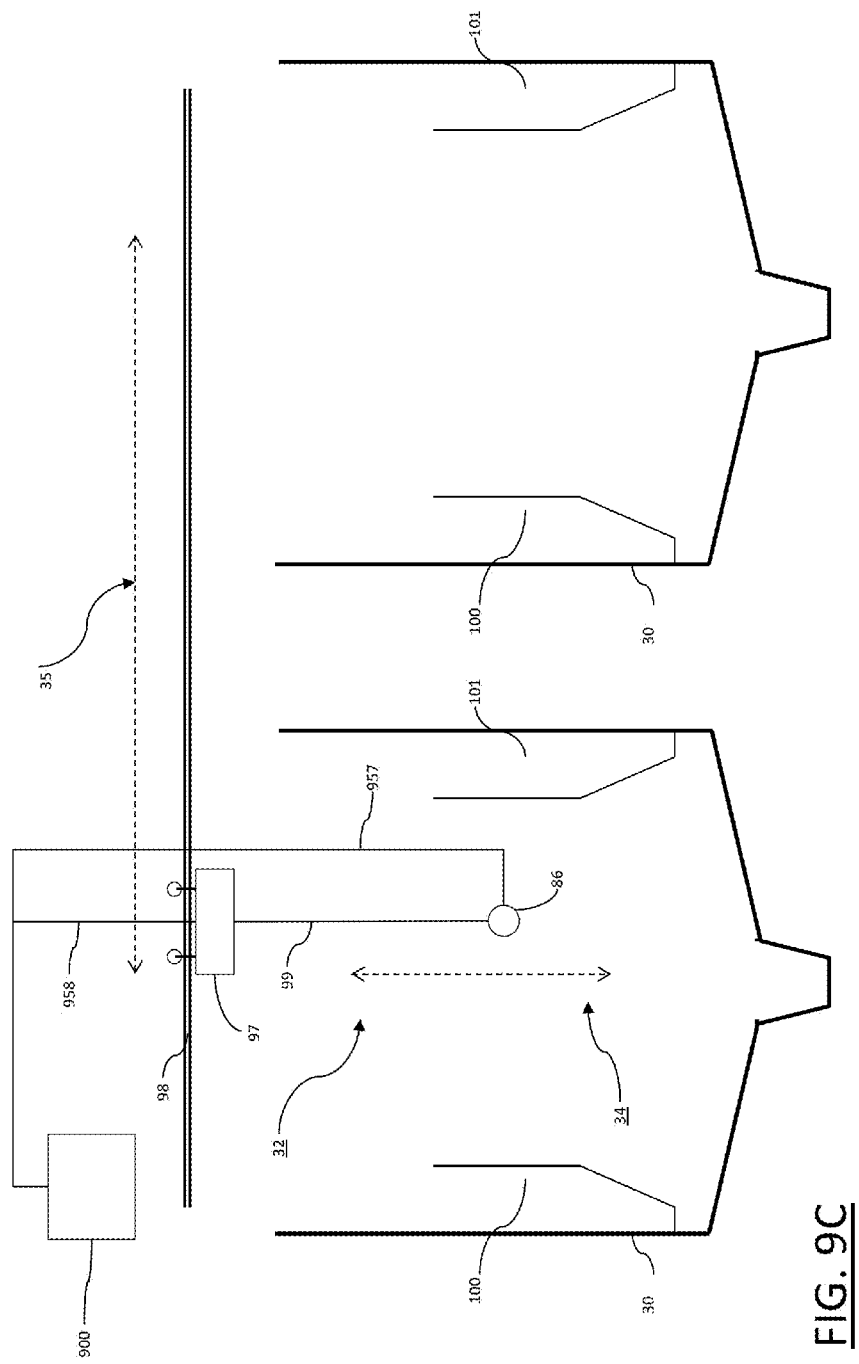
FIG. 9C shows a third exemplary embodiment for the arrangement of sensors for sensing characteristics of fluid in a clarification tank.

FIG. 9C shows another representative embodiment of the current application. Such an arrangement may be desirable when arranging for an individual sensor at every sample point would be prohibitively expensive or might require impractical cross-calibration of multiple sensors. Sensor 86, in communication with controller 900 via communication channel 957 is arranged to be geometrically positioned via winch 99. Sensor 86 is physically connected to winch 97 via cable 99. Winch 97 is in communication with and under the control of controller 900 via communication channel 958. Winch 97, responsive to controller 900, raises and lowers sensor 86 from an upper portion 32 of clarification tank 30 to a lower portion 34 of clarification tank 30. Winch 97, responsive to controller 900, is geometrically positional along rail 98 as shown with respect to the direction of translation 35 providing the ability to use a single sensor to sample fluid in clarification tank 30 and clarification tank 30'.

In one embodiment of the current application, controller 900 responsive to a measurement of BOD less than a predetermined threshold in a lower portion of clarification tank 30, adjusts the Low Tank Level set point to permit lowering of the decanter 50 beyond the current depth specified by the low tank level set point. In one embodiment of the current application, controller 900 responsive to a measurement of BOD greater than a predetermined threshold in a lower portion of clarification tank 30, adjusts the Low Tank Level set point to reduce the depth for lowering of the decanter 50 with respect to the current depth specified by the low tank level set point.

In one embodiment of the current application the waste water treatment plant 1 is operated in one of five modes:
Time of Day
Equalize
Variable Settling Time
High Flow
Maximum Flow The modes provide for a controlled increase in the rate of flow of waste water through the waste water treatment plant in the event of unanticipated deviations in the influent flow rate such as may occur during a storm event while gradually backing off from preferred methods of treating the waste water, e.g., to optimize waste water plant effluent quality and collection of biologically digestible materials. The modes provide an automated safety valve in the event of increased flows and the ability to make trade-offs according to a pre-determined strategy in an automated manner. The system automatically returns to normal operation when the influent flow characteristics return to the influent flow set points. The operational set points may be adjusted based upon on the mode, as described hereinbelow.

Time of Day Mode

The normal mode of operation for the waste water treatment plant is Time of Day. This can be changed manually by an operator overriding the automated controls of controller 900 of FIG. 1. In the Time of Day mode, the waste water treatment plant is receiving influent flow within set points used to characterize the influent. The influent flow set points may include one or more characteristics of the influent, including flow rates, pH, turbidity, BOD or any other chemical or physical characteristic of the influent. By way of example and not limitation, with reference to FIG. 1, in the Time of Day mode controller 900 compares the actual average influent flow rate being delivered to clarification tanks 30, 30', as measured by flow meters 5, 5' to an influent flow set point for average influent flow rate.

In the Time of Day mode, the controller 900 initiates a decanting cycle for a clarification tank 30, 30' after the influent flow to the clarification tank 30, 30' has been stopped for a period equal to or greater than Settling Time. Controller 900 alternates filling of clarification tank 30 and clarification tank 30', via control of valves 17a-17e responsive to a determination that one of the clarification tanks 30, 30': is full; or, is empty; or has been filling for an elapsed time greater than Maximum Filling Time. In one embodiment the actual tank liquid level of a clarification tank that has been filling for an elapsed time greater than Maximum Filling Time must be greater than the Minimum Tank Filling Level before the controller 900 will stop filling of the clarification tank and switch to the other tank. In one embodiment, the fluid level in clarification tank 30 is determined as described in the '197 application and the '994 application.

Equalize Flow Mode

Responsive to measuring an actual average influent flow rate that varies from the Time of Day mode influent flow set point for average influent flow rate by more than a predetermined amount, controller 900 switches from the Time of Day mode to the Equalize Flow mode for automated operation of the waste water treatment plant. In one embodiment the threshold is 10% of the influent flow set point value. The operating mode returns to Time of Day mode from Equalize flow mode when the variation between the actual average influent flow rate and the influent flow set point for the average influent flow rate is consistently less than a predetermined threshold for a predetermined period of time. With reference to FIG. 1, in the Equalize Flow Mode the controller 900 adjusts modulating valves 52, 52' to achieve an average effluent flow rate, from clarification tanks 30, 30', as measured with flow meters 55, 55', equal to the actual average influent flow rate as measured with flow meters 5, 5'.

Variable Settling Time Mode

Responsive to measuring an actual average influent flow rate that varies from the Equalize Flow mode influent flow set point for average influent flow rate by more than a predetermined amount, controller 900 switches from the Equalize Flow mode to the Variable Settling Time Mode for automated operation of the waste water treatment plant. In one embodiment the threshold is 10% of the influent flow set point value for Equalize Flow Mode. The operating mode returns to Equalize Flow mode from Variable Settling Time mode when the variation between the actual average influent flow rate and the influent flow set point for the average influent flow rate Equalize Flow mode is consistently less than a predetermined threshold for a predetermined period of time. With reference to FIG. 1, in the Variable Settling Time mode the controller 900 reduces the time between ending the influent flow into a clarification tank and the initiation of a decanting time below the Settling Time value used in the Time of Day Mode and Equalize Flow mode as required to achieve an average effluent flow rate, from clarification tanks 30, 30', as measured with flow meters 55, 55', equal to the actual average influent flow rate as measured with flow meters 5, 5'.

High Flow Mode

Responsive to measuring an actual average influent flow rate that varies from the Variable Settling Time Mode influent flow set point for average influent flow rate by more than a predetermined amount when the time between ending the influent flow into a clarification tank and the initiation of a decanting time is less than a predetermined time threshold, the controller 900 switches from the Variable Settling Time mode to High Flow mode for automated operation of the waste water treatment plant. In one embodiment the predetermined time threshold is one minute. The operating mode returns to the Variable Settling Time mode from the High Flow mode when the variation between the actual average influent flow rate and the Variable Settling Time mode influent flow set point for the average influent flow rate is consistently less than a predetermined threshold for a predetermined period of time. With reference to FIG. 1, in the High Flow mode the controller 900 initiates a decanting cycle as soon as a clarification tank is full. Controller 900 alternates filling between clarification tank 30 and clarification tank 30' as soon as the other tank is full.

In another embodiment, controller 900 modulates the effluent flow between influent rate average and maximum effluent flow rate as tank capacity varies between Maximum Reserve Tank Capacity and Minimum Reserve Tank Capacity. (Example values: Maximum Reserve Tank Capacity=30 minutes; Minimum Reserve Tank Capacity=10 minutes.) Maximum Reserve Tank Capacity and Minimum Reserve Tank Capacity values are based on FIG. 1 wet well 12 capacity. During Max Flow mode, responsive to measurement of the wet well influent flow rate, if the remaining time to fill the clarification tank is less than the Minimum Reserve Tank Capacity amount, the controller 900 modulates the decanter effluent flow rate to its maximum physical limit During Max Flow mode, responsive to measurement of the wet well influent flow rate, if the remaining time to fill the clarification tank is greater than the Maximum Reserve Tank Capacity amount, the controller 900 modulates the decanter effluent modulate the decanter effluent flow rate to be equal to the average influent flow rate.

Maximum Flow Mode

In one embodiment, responsive to measuring one or more of clarification tanks 30, 30' with a capacity less than the Maximum Reserve Tank Capacity, controller 900 switches from the High Flow mode to Maximum Flow mode. The operating mode returns to the High Flow mode from the Maximum Flow mode when one of clarification tanks 30, 30' capacity is greater than Maximum Reserve Tank Capacity by a predetermined threshold and the fluid level of the one of the clarification tanks 30, 30' is equal to the Low Tank Level. With reference to FIG. 1, in the Maximum Flow mode the controller 900 maintains continuous decanting filling and decanting of clarification tanks 30, 30' at the maximum possible clarification tank effluent flow rates.

In systems with clarification tanks that have multiple decanters (not shown) all decanters are put into operation to maximize flow through the clarification tanks. All waste water plant operations, such as decanter cleaning, that would otherwise slow the flow of waste water through the plant are suspended.

Alternatively, responsive to detecting that clarification 30' is out of services, such as may occur if there is a component failure that makes clarification tank 30' inoperative, controller 900 may operate clarification tank 30 in Maximum Flow mode until clarification tank 30' returns to service. Additionally, an operator may manually direct controller 900 to operate clarification tank 30 in Maximum Flow mode when taking clarification tank 30' out of service for routine or preventative maintenance.

During Maximum Flow mode any other operations, such as cleaning of the decanters, that would slow flow of fluid through the plant are suspended.

Computer software and/or firmware used in the operation of any of the processors described hereinabove can be provided on a computer readable non-transitory storage medium. Similarly, measured sensor data can be stored on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An adaptive waste water treatment plant comprising:
an influent intake configured to receive an influent flow from a waste water influent stream, said influent intake fluidly coupled to a first settling tank and fluidly coupled to a second settling tank;
a controller;
said first settling tank comprising:
a first vertical lift screen decanter disposed in or above said first settling tank in fluid communication with a first effluent discharge pipe;
a first effluent discharge valve communicatively coupled to said controller and configured to control a fluid communication between said first vertical lift screen decanter and said first effluent discharge pipe;
a first flow meter in communication with said controller and adapted to measure a rate of flow through said first effluent discharge pipe;

said second settling tank comprising:
  a second vertical lift screen decanter disposed in or above said second settling tank in fluid communication with a second effluent discharge pipe;
  a second effluent discharge valve communicatively coupled to said controller and configured to control a fluid communication between said second vertical lift screen decanter and said second effluent discharge pipe;
  a second flow meter in communication with said controller and adapted to measure a rate of flow through said second effluent discharge pipe; said influent intake comprising one or more valves controlling fluid communication between said influent stream and said first settling tank and between said influent stream and said second settling tank; and
  wherein said controller is configured to control said one or more valves between said influent intake and said first settling tank and between said influent intake and said second settling tank in response to a change in a rate of influent flow.

2. The adaptive waste water treatment plant of claim 1, wherein, said controller is configured to close said first effluent discharge valve and to place the influent stream in fluid communication with said first settling tank to fill said first settling tank, to close said second effluent discharge valve and place said influent stream in fluid communication with said second settling tank to fill the second settling tank, to open said first effluent discharge valve to decant said first settling tank after a predetermined first settling time, said first settling time commencing with a complete filling of said first settling tank, and, to open said second effluent discharge valve to decant said second settling tank after a predetermined second settling time, said second settling time commencing with a complete filling of said second settling tank.

3. The adaptive waste water treatment plant of claim 1, further comprising an influent flow sensor in communication with said controller and adapted to measure a rate of influent flow, wherein said controller adjusts at least one of said first effluent discharge valve and said second effluent discharge valve such that the rate of flow through at least one of: said first effluent discharge pipe and said second effluent discharge pipe, or a combined rate of flow through the first effluent discharge pipe and the second discharge pipe, is substantially equal to or greater than said rate of influent flow.

4. The adaptive waste water treatment plant of claim 1, further comprising an influent flow sensor in communication with said controller to measure a rate of influent flow, wherein said controller sets a value of at least one of: a first settling time and a second settling time, so that at least one of: the rate of flow through the first effluent discharge pipe and the rate of flow through said second effluent discharge pipe, or a combined rate of flow through the first effluent discharge pipe and said second discharge pipe substantially equal to or greater than said rate of influent flow.

5. The adaptive waste water treatment plant of claim 1, further comprising a wet well of known volumetric capacity to receive the influent stream, said wet well configured with a first sensor to detect a lower fluid level in said wet well and a second sensor to detect an upper fluid level in said wet well, said first and second sensors in communication with said controller, the controller further adapted to measure a time for the influent stream to fill said wet well, the controller further arranged to utilize said time and said known volumetric capacity to calculate said rate of influent flow, wherein said controller sets a value of at least one of a first settling time and a second settling time to a value so as at least one of said rate of flow through said first effluent discharge pipe and said rate of flow through said second effluent discharge pipe, or a combined rate of flow through said first effluent discharge pipe and the second discharge pipe is substantially equal to or greater than said rate of influent flow.

6. The adaptive waste water treatment plant of claim 1 further comprising a pump to pump the influent stream to said first settling tank and said second settling tank, said pump operating at a known pumping rate, said pump further in communication with said controller, said controller configured to measure a duration of time said pump operates to pump influent to said first settling tank and said second settling tank, and to calculate a rate of influent flow based on a duration of time and a known pumping rate, wherein said controller sets a value of at least one of a first settling time and a second settling time to a value so that a rate of flow through at least one of: said first effluent discharge pipe and said second effluent discharge pipe, or a combined rate of flow through said first effluent discharge pipe and said second discharge pipe is substantially equal to or greater than the rate of influent flow.

7. The adaptive waste water treatment plant of claim 1, wherein said controller places the influent stream in fluid communication with said first settling tank, and not in fluid communication with said second settling tank, and responsive to detecting a predetermined switching criteria, and said controller places the influent stream in fluid communication with said second settling tank, and not in fluid communication with said first settling tank.

8. The adaptive waste water treatment plant of claim 7, wherein at least one predetermined switching criteria is selected from the group consisting of: an amount of fluid in the first settling tank exceeding a first predetermined threshold, a volume of fluid in the settling tank being less than a second predetermined threshold, and a time that the influent stream has been in fluid communication with said first settling tank exceeding a third predetermined threshold.

9. The adaptive waste water treatment plant of claim 8, wherein, said controller is responsive to at least one missing exception criterion.

10. The adaptive waste water treatment plant of claim 9, wherein said at least one exception criterion comprises an amount of fluid in the first settling tank being less than a predetermined minimum threshold.

11. The adaptive waste water treatment plant of claim 1, wherein at least one of the first vertical lift screen decanter and the second vertical lift screen decanter comprises a screen box.

12. The adaptive waste water treatment plant of claim 1, wherein said controller is configured to control said first settling tank controllable fluid communication and said second settling tank controllable fluid communication according to a time of day mode.

13. The adaptive waste water treatment plant of claim 1, wherein said controller is configured to control said first settling tank controllable fluid communication and said second settling tank controllable fluid communication according to an equalize flow mode.

14. The adaptive waste water treatment plant of claim 1, wherein said controller is configured to control said first settling tank controllable fluid communication and said second settling tank controllable fluid communication according to a variable settling time mode.

15. The adaptive waste water treatment plant of claim 1, wherein said controller is configured to control said first settling tank controllable fluid communication and said second settling tank controllable fluid communication according to a high flow mode or a maximum flow mode.

* * * * *